Feb. 18, 1969 A. NEWTON 3,428,900

DISTRIBUTED FEEDBACK FREQUENCY COMPRESSION IN FREQUENCY MODULATION RECEPTION

Filed Nov. 26, 1965

INVENTOR.
ARNOLD NEWTON
BY Edward J. Norton
Attorney

United States Patent Office 3,428,900
Patented Feb. 18, 1969

3,428,900

DISTRIBUTED FEEDBACK FREQUENCY COMPRESSION IN FREQUENCY MODULATION RECEPTION

Arnold Newton, Forest Hills, N.Y., assignor to Radio Corporation of America, a corporation of Delaware Filed Nov. 26, 1965, Ser. No. 509,827
U.S. Cl. 325—346 6 Claims
Int. Cl. H04b *1/26*

ABSTRACT OF THE DISCLOSURE

In a frequency modulation receiver, a loop feeding back a controlled frequency to a plurality of mixers for the purpose of increasing sensitivity.

Figure 1:
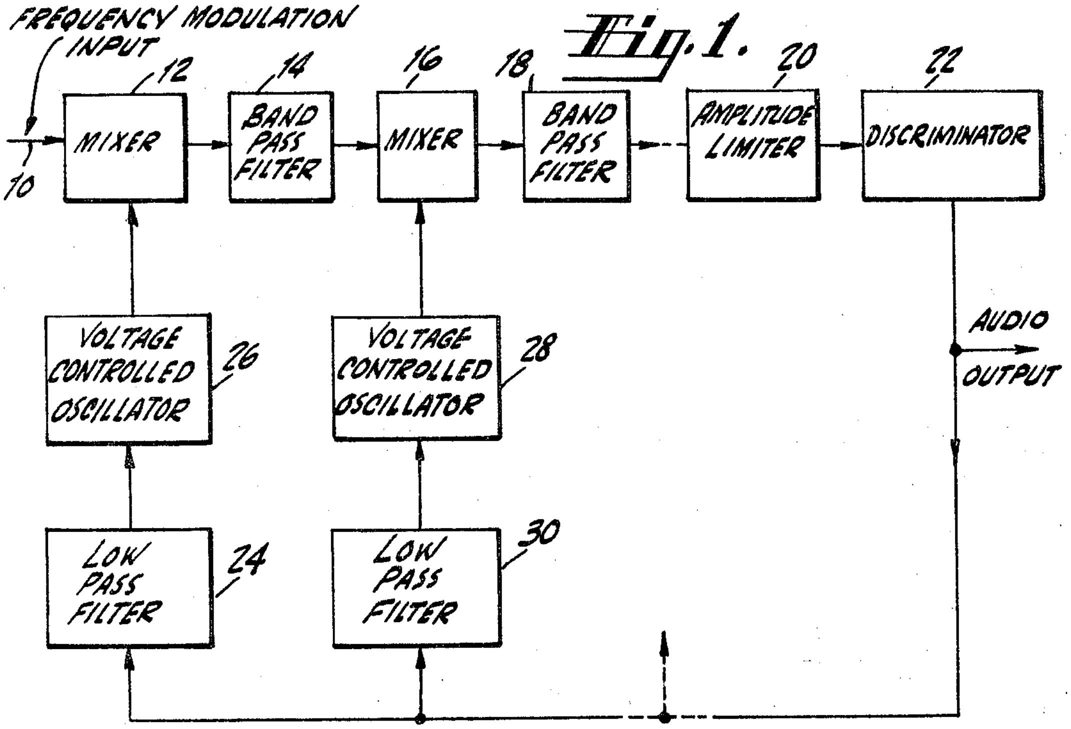

This invention relates to frequency modulation reception in which frequency deviation of the received modulated wave is reduced or compressed.

In frequency modulation, the frequency of a carrier wave is varied above and below its unmodulated or center frequency in accordance with the modulation signal. As is understood, the signal to noise ratio of the transmitted signal is increased by so frequency modulating the wave as to cause a wide deviation of the carrier.

However, such modulation necessitates either a wide band frequency discriminator in the receiver, that is a discriminator that will detect the widely deviated carrier, or it necessitates a means to reduce the deviation of the received frequency modulated wave if a narrow band discriminator is to be used.

To receive a wide-deviation signal, the frequency acceptance bandwidth of the receiver must be correspondingly wide. Since the noise power which is received by the receiver is proportional to the bandwidth thereof, wide bandwidth results in a high noise level at the discriminator and a corresponding decrease in sensitivity of the receiver. That is, the minimum value of the carrier power at the receiver for which the signal is discernable increases as the bandwidth of the receiver is increased. By incorporating a frequency deviation compressor in the receiver, the bandwidth of the receiver can be reduced whereby the sensitivity of the receiver may be increased while retaining the large signal to noise ratio advantage associated with the large deviation of the incoming wave.

Such a frequency deviation compressor may comprise a local oscillator whose output frequency is varied or deviated by a control voltage applied thereto, in proportion to the frequency of the received frequency modulated wave, but over a smaller range than the range of deviation of the received wave, and a mixer to which the received wave and the locally produced frequency deviated wave are applied. An output of the mixer is then a frequency modulated wave whose deviation is the difference of the deviations of the received wave and the locally produced wave. That is, the output of the mixer is then a frequency modulated wave of reduced deviation, as compared with the received frequency modulated wave and may be applied to a discriminator having a narrower acceptance band than if the frequency deviation reducing device had not been used. The control voltage for accomplishing the decrease in deviation may be obtained from the discriminator, amplified and fed back to control the frequency of the local oscillator whereby the frequency of the local oscillator is proportional to the feedback voltage. Therefore, as the feedback gain is increased to decrease the deviation of the signal, the bandwidth of the receiver can be reduced.

There is a limit, however, to the amount of compression that would be useful in improving the sensitivity. Increased feedback gain subjects the local oscillator to increased noise level which will then limit the sensitivity of the system. This is due to the fact that the oscillation frequency jitter or noise of the voltage controlled oscillator is proportional to the closed loop bandwidth of the loop including the voltage controlled oscillator, which is itself proportional to the product of the open loop bandwidth of the loop including the oscillator and the feedback gain. Therefore, an increase in feedback gain adds noise to the voltage controlled oscillator and reduces the sensitivity of the receiver.

It is an object of this invention to provide a frequency modulation receiver apparatus having a greater sensitivity than prior art frequency modulation receivers.

In accordance with one embodiment of this invention, a plurality of waves are locally produced which deviate in frequency in a manner corresponding to the deviations of a received frequency modulated wave. The received wave is successively mixed or heterodyned with each of the plurality of locally produced deviated waves, whereby each time the received wave is so heterodyned, the deviation of the selected modulation product is reduced or compressed successively or in a distributed manner. After a plurality of such heterodynings, received frequency modulated waves of greatly reduced deviations are produced having a bandwidth equal to the spectrum band, that is a bandwidth sufficient to include enough energy so that the detected wave is not substantially distorted. These reduced deviation waves are applied to a frequency discriminator which accepts substantially only the band of deviated frequencies applied thereto, or to a frequency discriminator through a band bass filter passing substantially only the frequency modulated wave of greatly reduced deviation. Band pass filters are provided after each mixer. The pass band of each band pass filter is such that it passes substantially only the frequency modulated signal wave applied thereto. A wave having a minimum deviation is passed by a narrow frequency band pass filter and is detected by a narrow frequency band discriminator whereby received noise outside of the band pass of the narrow frequency band filter is eliminated. Since, at the same time, the oscillator noise produced by controlling the frequency of the sources of oscillations is reduced, the sensitivity of the frequency modulation receiver will be increased.

Figure 2:
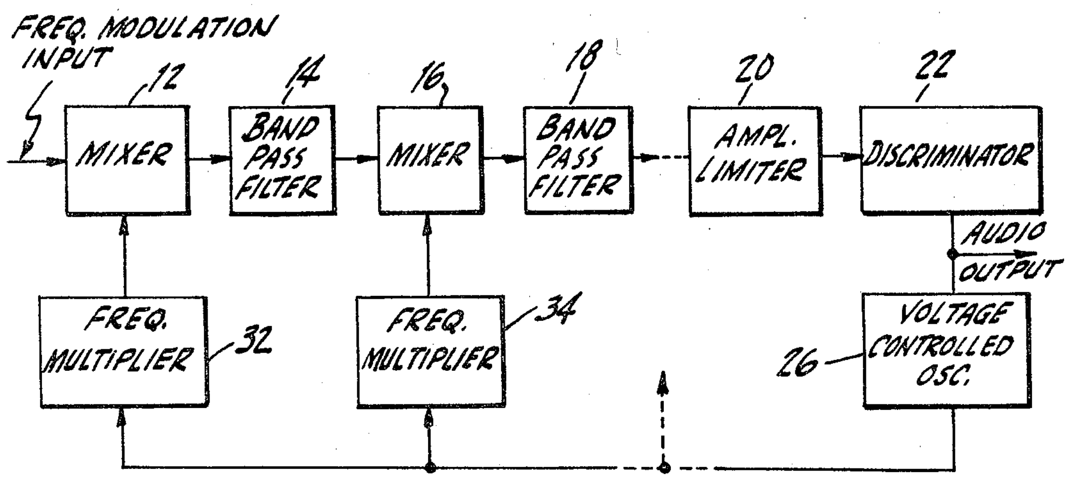

The novel features of the invention both as to its organization and method of operation as well as additional objects and advantages thereof will be understood more readily from the following description when read in conjunction with the accompanying drawing in which:

FIGURE 1 is a schematic circuit diagram of a first embodiment of this invention, and FIGURE 2 is a schematic circuit diagram of a second embodiment of this invention.

Turning first to FIGURE 1, a frequency modulated wave is applied to the input terminal 10 of a mixer 12. This frequency modulated wave may be the wave received at the antenna (not shown) of a radio frequency receiver with or without amplification, or it may be an intermediate frequency produced by beating or heterodyning the received wave with a tunable frequency local oscillator, or it may be a frequency modulated wave whose center frequency is automatically controlled by automatic frequency control apparatus (not shown). As will be explained, the deviation of the frequency modulated wave applied to the mixer 12 is reduced therein. The output of the mixer 12 is applied to the input terminal of a band pass filter 14 having a pass band such that it just passes the signal waves applied thereto and tends to block waves of a frequency outside of the band of deviation of the frequency modulated wave applied thereto. The output of the band pass filter 14 is applied to a second mixer 16 in which the deviation of the frequency modulated wave applied thereto is further reduced as will be explained.

The output of the mixer 16 is applied to a second band pass filter 18, which has a pass band just wide enough to pass the frequency modulated wave of reduced deviation appearing at the output of the mixer 16. The output of the filter 18 is fed either directly or through other mixers and band pass filters (not shown), if desired, to the input of an amplitude limiter 20, which removes any amplitude modulation that may be present in the wave applied thereto. The output of the amplitude limiter 20, which is of constant amplitude, but whose deviation in frequency is much less than that of the wave applied to the mixer 12, is applied to a discriminator 22. The output of the discriminator 22, which is the audio modulation applied at the transmitter of the transmitted wave, is applied to a utility device such as a loud speaker (not shown).

The audio frequency output is also applied through a low pass filter 24, which suppresses any high frequency that may be present in the output of the discriminator 22, to a voltage controlled oscillator 26. The voltage controlled oscillator 26 therefore varies or deviates in frequency in accordance with the deviations in frequency of the frequency modulated wave applied to the mixer 12. Since the output of the voltage controlled oscillator 26 is also applied to the mixer 12, the output of the mixer 12 is a wave whose deviation from its center frequency is less than the deviation in the input frequency modulated wave applied thereto, but whose deviation is linearly proportional to the deviations in frequency of the input wave. In a similar manner, a frequency deviated wave is applied to the mixer 16 by a voltage controlled oscillator 28, frequency controlling voltage being applied to the voltage controlled oscillator 28 from the discriminator 22 through a low pass filter 30. The deviation of the output of the voltage controlled oscillator 28 may be the same as the deviation of the output of the voltage controlled oscillator 26, and the deviation of the output of the mixer 16 will be less than the deviation of the input thereto and will be linearly proportional to the deviation of the input wave applied to the mixer 12. If desired, further low pass filters and voltage controlled oscillators and mixers may be provided in the circuit of FIGURE 1 at the dotted line portion thereof, whereby the deviation of the wave applied to the limiter 20 may be still further reduced. In each case, the band pass filters 14 and 18 provided after each mixer 12 and 16 (and subsequent ones if further mixers are used), eliminates any noise outside the band of acceptance of the several successive band pass filters of successively narrower band width, whereby the signal to noise ratio of the frequency modulation receiver is increased.

In the embodiment of FIGURE 2 in which elements corresponding to the elements of FIGURE 1 have been given corresponding reference numbers, one voltage controlled oscillator 26 is provided. This voltage controlled oscillator is controlled in frequency by the output of the discriminator 22 and the deviated output frequency of this voltage controlled oscillator 26 is applied directly or through the intermediary of respective frequency multipliers 32 and 34 to the mixers 12 and 16. Each frequency multiplier 32 and 34 multiplies the frequency of the wave applied thereto and therefore multiplies the deviation thereof. The multiplied deviation remains in phase with the deviation of the output of the voltage controlled oscillator 26, and therefore the deviations of the output of the successive mixers 12 and 16 are successively less and are linearly proportional to the deviation of the input wave applied to the mixer 12. If desired, further mixers and band pass filters may be provided between the band pass filter 18 and the limiter 20, and a frequency multiplier, whose input wave is provided by the voltage controlled oscillator 26, is provided for each added mixer, whereby the deviation of the signal applied to the limiter 20 in FIGURE 2 may be still further reduced. In each case the band pass filter such as 14 or 18, following a mixer accepts only the band of deviated waves applied thereto and therefore eliminates noise outside of the acceptance band of the band pass filter.

Frequency modulation receivers have been built using the distributed feedback deviation reduction or frequency compression apparatus disclosed in which the sensitivity has been increased by six decibels over frequency modulation receivers in which only one deviation reduction step has been employed. This in effect reduces by four to one the transmitter power requirements for the same sensitivity or doubles the range of the receiver if the transmitted power is not reduced. A reason why the described frequency modulation receiver, which includes distributed feedback frequency compression that employs a plurality of steps of frequency deviation reduction, exhibits this four fold increase in sensitivity over the frequency modulation receiver using only one frequency deviation reduction is, it is believed, due to the fact that the larger gain required in such a prior art system to produce the given compression results in more noise being impressed on the voltage controlled oscillator used in such a receiver. This increase in noise results in added noise that is within the band of the band pass filter, and this added noise reduces the signal to noise ratio of the receiver or degrades its sensitivity.

Although only two forms of plural deviation reduction frequency modulation receivers have been described, variations therefore are possible within the spirit of the present invention. Hence it should be understood that the foregoing description is to be considered as illustrative and not in a limiting sense.

What is claimed is:

1. A frequency modulation receiver comprising
input means for receiving a frequency modulated wave,
at least a first and a second mixer and a discriminator connected in tandem to said input means in the order named,
means responsive to the output of said discriminator for producing at least two local frequency modulated waves which deviate in frequency in a manner proportional to the frequency deviations of said received frequency modulated wave, but whose deviations from center frequency are less than the deviations of said received frequency modulated wave, and
means to apply the locally produced frequency modulated waves of lesser deviation to said first and second mixers respectively,
whereby the frequency deviation of the output of a successive mixer is less than the deviation of the output of a previous mixer and whereby the bandwidth of the received frequency modulated wave is successively reduced in a distributed manner, resulting in greater sensitivity of the receiver.

2. The invention described in claim 1 in which said means to produce a local frequency modulated wave comprises at least two voltage controlled oscillators.

3. The invention described in claim 1 in which a band pass filter is provided between the first mixer and the second mixer having a pass band substantially equal to the spectrum width at the output of the first mixer, and
a second band pass filter is provided between the second mixer and the discriminator, said second band pass filter having a band pass equal to the spectrum width of the output of said second mixer.

4. The invention described in claim 1 in which said means to produce local frequency modulated waves comprises a voltage controlled oscillator and at least two frequency multipliers.

5. The invention as described in claim 3 in which said means to produce a local frequency modulated wave comprises a voltage controlled oscillator and at least two frequency multipliers.

6. The invention as described in claim 3 in which said means to produce a local frequency modulated wave comprises a plurality of voltage controlled oscillators, one for each of said mixers.

References Cited

UNITED STATES PATENTS 3,343,092 9/1967 Davids et al.

KATHLEEN H. CLAFFY, *Primary Examiner.*

W. A. HELVESTINE, *Assistant Examiner.*

U.S. Cl. X.R.

325—345, 425